United States Patent
Grandin et al.

(10) Patent No.: US 9,124,805 B2
(45) Date of Patent: Sep. 1, 2015

(54) ADAPTING AN OPTICAL IMAGE STABILIZER ON A CAMERA

(71) Applicant: RESEARCH IN MOTION LIMITED, Waterloo (CA)

(72) Inventors: Thomas Guillaume Grandin, Kitchener (CA); Yun Seok Choi, Waterloo (CA); Robert Francis Lay, Waterloo (CA); Ian Edward Charles Rogers, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 235 days.

(21) Appl. No.: 13/678,583

(22) Filed: Nov. 16, 2012

(65) Prior Publication Data
US 2014/0139694 A1 May 22, 2014

(51) Int. Cl.
*H04N 5/232* (2006.01)

(52) U.S. Cl.
CPC ....... *H04N 5/23248* (2013.01); *H04N 5/23264* (2013.01); *G03B 2205/0007* (2013.01); *G03B 2217/005* (2013.01); *H04N 5/2328* (2013.01); *H04N 5/23258* (2013.01); *H04N 5/23287* (2013.01)

(58) Field of Classification Search
CPC .......... H04N 5/23248; H04N 5/23264; H04N 5/2328; H04N 5/23287
USPC .................................................... 348/208.99
See application file for complete search history.

(56) References Cited

U.S. PATENT DOCUMENTS

| 5,937,221 | A | * | 8/1999 | Yamamoto et al. | ........... 396/429 |
| 2006/0291841 | A1 | * | 12/2006 | Fukumoto et al. | .............. 396/55 |
| 2011/0122268 | A1 | * | 5/2011 | Okamoto et al. | ........ 348/208.12 |
| 2011/0150451 | A1 | | 6/2011 | Kubota | |
| 2011/0193990 | A1 | | 8/2011 | Pillman et al. | |
| 2012/0113515 | A1 | * | 5/2012 | Karn et al. | ..................... 359/557 |

FOREIGN PATENT DOCUMENTS

EP          1672914          6/2006

OTHER PUBLICATIONS

Panasonic, "The Simple, Stylish, Smart S-series", 2012, pp. 1-4, retrieved Sep. 28, 2012.
Browne, Mike, "Nokia Lumia 920 PureView low-light challenge versus iPhone 5, HTC One X, Galaxy S III", Noknok, Sep. 28, 2012, http://www.noknok.tv/2012/09/28/nokia-lumia-920-pureview-low-light-challenge-versus-iphone-5-htc-one-x-galaxy-s-iii/, pp. 1-10, retrieved Sep. 28, 2012.
Wikipedia, "Image Stabilization", http://web.archive.org/web/20120815133617/http://en.wikipedia.org/wiki/Image_stabilization, retrieved Aug. 15, 2012, pp. 1-6.

(Continued)

*Primary Examiner* — James Hannett
(74) *Attorney, Agent, or Firm* — Rowand LLP

(57) ABSTRACT

Disclosed are methods and systems of adapting an optical image stabilizer (OIS) for a camera, the methods comprising acquiring an image of the scene; obtaining image context associated with the image of the scene; selecting a mode of operating the OIS based on the obtained image context; and, applying the OIS using the selected mode of operation.

18 Claims, 5 Drawing Sheets

(56) References Cited

OTHER PUBLICATIONS

Lord, Chris, "Optical Image Stabilization—Myths & Misunderstandings", Mar. 5, 2010, http://www.brayebrookobservatory.org/BrayObsWebSite/HOMEPAGE/OIS_M%26M.html, retrieved Apr. 19, 2012.

Extended European Search Report dated Jun. 7, 2013.

* cited by examiner

ADAPTING AN OPTICAL IMAGE STABILIZER ON A CAMERA

FIELD

The present matter is related to optical image stabilizers (OIS) and in particular to OISs for cameras in electronic devices.

BACKGROUND

Communication devices such as mobile communication devices may be equipped with cameras. Cameras can use optical image stabilizers to assist with stabilizing the camera while the camera is capturing an image.

BRIEF DESCRIPTION OF DRAWINGS

In order that the subject matter may be readily understood, embodiments are illustrated by way of examples in the accompanying drawings, in which.

DETAILED DESCRIPTION

Figure 1:
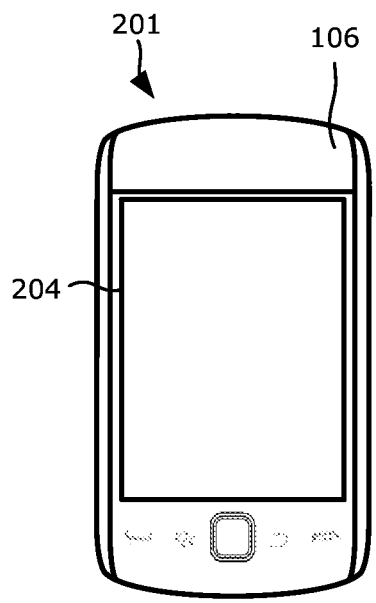
FIG. 1 is a front elevation view of an example electronic device in accordance with example embodiments of the present disclosure.

In accordance with an aspect described is a method of adapting an optical image stabilizer (OIS) for a camera, the method comprising acquiring an image of the scene; obtaining image context associated with the image of the scene; selecting a mode of operating the OIS based on the obtained image context; and, applying the OIS using the selected mode of operation.

In accordance with another aspect, described is an electronic device comprising: a camera configured to acquire an image of the scene; an image signal processor (ISP) connected to the camera for obtaining image context associated with acquired image of the scene; and, an optical image stabilizer (OIS) connected to the camera, the OIS configured to operate in one of a selection of modes of operation based on image context obtained by the ISP.

In accordance with another aspect, described is a computer readable memory comprising computer-executable instructions which, when executed, cause a processor to: instruct a camera to acquire an image of the scene; obtain image context associated with the image of the scene; select a mode of operating an optical image stabilizer (OIS) based on the obtained image context; and, apply the OIS using the selected mode of operation.

Cameras may be installed on electronic devices, such as mobile devices. Cameras installed on mobile communication devices may be smaller than other types of handheld cameras such as point-and-shoot cameras. Smaller cameras can have smaller parts, including smaller lenses and smaller image sensors, and may also have smaller pixel sizes for representing or capturing images. As a consequence, the exposure time may need to be increased (as compared to cameras with larger pixel sizes) in order to allow enough light to enter the smaller pixels during the image acquisition.

One potential effect of longer exposure times, especially with handheld cameras, is that the cameras may be prone to inadvertent movements, which can result in a blurry image because the details of an optical image are spread on larger areas of the image sensor due to the camera movement. Thus, longer exposure time can lead to more error or imprecision in the image quality due to one or more inadvertent movements of the electronic device or camera relative to the environment that is being captured in the image. In order to counteract this problem, electronic devices can apply gain to the captured image to amplify and otherwise affect the electronic signal that represents the captured image so that it may appear brighter and easier to see. Accordingly the use of gain can decrease the need for exposure time that is required. However, gain applied to the captured image can increase the noise level of the captured image resulting in a grainy image.

To address one or more of the above-noted issues an optical image stabilizer can be implemented on the camera or electronic device that includes a camera. The optical image stabilizer can be used to stabilize the camera relative to the environment (or image being captured) so that the camera can remain exposed for a relatively longer period of time. For example, a mobile communication device with a camera may be able to capture an image with a relatively longer exposure time by using an optical image stabilizer because the risk of inadvertent movement of the camera relative to the environment is diminished by the presence of the optical image stabilizer. Thus, it may be less important to apply gain to the captured image when an optical image stabilizer is used resulting in less risk of a blurry captured image.

However, there may be certain problems with the implementation of an optical image stabilizer on a mobile communication device or a camera. For example, the implementation of an optical image stabilizer may be non-uniform so that certain areas of a captured image (e.g. the corners of the image) are not stabilized as sharply as other areas resulting in the corners of a captured image becoming blurry. By way of further example, the components of an optical image stabilizer may be smaller for a camera in a mobile communication device as compared to those found in another camera and therefore may be relatively more prone to mechanical or optical errors. During the time an image is being stabilized using the optical image stabilizer, the errors in the optical image stabilizer may compound, making the resulting image more blurry. For example, when a camera is in use, the optical image stabilizer may introduce mechanical defects through certain operations such as tilting the lens relative to the sensor. Such defects can result in a lower image quality when the optical image stabilizer is used as compared to the image quality that would result by not using the optical image stabilizer.

In order to address at least one of the above-noted issues an optical image stabilizer may be selectively implemented on a camera. For example, the optical image stabilizer may be implemented depending on the image of the scene or image context related to the camera at the time the image is captured. By way of further example, the optical image stabilizer may be partially implemented depending on the image of the scene or image context. For example, the optical image stabilizer may be configured to compensate for or counteract only certain camera movements, certain amounts of camera movements or certain types of camera movements depending on the image context itself.

Cameras installed on electronic devices may also be used to capture videos. Similarly, cameras installed on electronic devices may also be configured to implement (or display) a streaming viewfinder while capturing an image. For example, the streaming viewfinder may display video data or video images prior to and while a signal is received to capture an image that is displayed in the streaming viewfinder. The environment or context in which an image is captured can be different from the environment or context in which a video is captured. For example, when capturing a video, the context or environment can continuously change, whereas when capturing an image the intention may be that the context or environment remains still. By way of further example, a particular defect that can arise while video is being captured is the visible shaking of the video during the time this video is recorded or captured.

To address one or more of the above-noted issues an optical image stabilizer can be implemented on a camera or on an electronic device that includes a camera. The optical image stabilizer can be used to stabilize the image relative to the camera movement in order to limit or attempt to avoid visible shaking on the captured video.

However, the stabilization during video capture or during the viewfinding that can occur prior to and during image capture may induce a general degradation of the user experience. For example, such stabilization may not be able to compensate for all the camera movements. This might result in a residual low frequency movement highly visible on the video or viewfinder, degrading the general user experience. By way of further example, such implementation of the optical image stabilizer may generate extra defects such as audible noises in a certain range of compensation. This might result in an audible noises recorded by the speakers, degrading the general user experience. In yet another example, the temperature of the camera or optical image stabilizer may adversely affect the performance, behaviour or power consumption of the optical image stabilizer. Certain temperatures may induce unwanted visible content in video for certain temperatures resulting in lower video quality compared to a video that is captured without the use of an optical image stabilizer or resulting in operational malfunctions of the camera or electronic device associated with the camera.

In order to address at least one of the above-noted issues an optical image stabilizer may be selectively implemented on a camera. For example, the optical image stabilizer may be implemented depending on the image context related to the camera at the time the video is captured. For example, the optical image stabilizer may be configured to compensate for or counteract only certain camera movements, certain amounts of camera movements or certain types of camera movements arising during the implementation or use of the viewfinder or during video acquisition or video capture.

The image context, which is discussed in more detail below, can include the intensity of the light available to the camera (or any other parameter associated with the camera such as the exposure time), the colour spectrum (or colour temperature or histogram) in the image to be captured, the zoom level, the temperature of the environment or camera, the time of day, geolocalization information (e.g. from one or more sensors associated with the camera), the flash activation (e.g. whether the flash is activated), or other indications or data available from the captured media (e.g. from the captured video or viewfinder), etc. The image context, for example, can be data obtained from a processor (e.g. the time or temperature) at or around the time of the image capture. By way of further example, the image context can be obtained from the camera (or from an image sensor in the camera). By way of further example, the image context can be obtained from the camera application (e.g. whether the flash is activated, or whether the camera is in video or still-picture or viewfinder mode). In yet a further example, the image context can be obtained from a sensor, such as a gyroscope, accelerometer or magnetometer. Image context can include any combination of the above noted examples of image context.

In one or more embodiments, an image of the scene or image context relating to the camera at the time an image is captured may identify certain predefined types of environments. For example, an image signal processor associated with the camera may process or evaluate image context to determine whether the image context indicates or identifies a predefined type of environment. Predefined environments can include ranges of colour temperatures, ranges of light intensity, ranges of time of day, and other types of image context or combinations of image context.

Predefined environments can be associated with types or modes of operation of an optical image stabilizer associated with the camera. For example, an image context that indicates an intensity of light at least above a predefined threshold may be associated with not operating the optical image stabilizer. This can be because the level of light indicates a relatively short exposure time will be required so that the risk of inadvertent camera movement is minimized (and so the use of the optical image stabilizer is not necessarily beneficial). Or image context that indicates that a camera lens is zoomed in to a particular image may be associated with operating the optical image stabilizer. This can be because when the field of view is reduced, the defects introduced by the optical image stabilizer in the corners of the image may be minimized or not visible and, as such, the risk of the corners being blurry due to non-uniform application of the optical image stabilizer may be negligible. By way of further example, the colour temperature of an image to be captured could be consistent with an outdoor landscape image at dusk (e.g. with a relatively minimal amount of light) and the camera or lens configuration could be consistent with not zooming in. In such a situation a predefined operation or setting of the optical image stabilizer may be a different operation such as compensating for only a limited amount or a different range of camera movement.

Example Communication Device

Referring first to FIG. 1, a front view of an example electronic device 201 is illustrated. The electronic device can be a mobile phone, portable computer, smartphone, tablet computer, personal digital assistant, a wearable computer such as a watch, a television, a digital camera or a computer system, for example. The electronic device may be of a form apart from those specifically listed above.

FIG. 1 illustrates a front view of the electronic device 201. The front view of the electronic device 201 illustrates a front face 106 of the electronic device 201. The front face 106 of the electronic device 201 is a side of the electronic device 201 which includes a main display 204 of the electronic device 201. The front face 106 of the electronic device 201 is a side of the electronic device 201 which is configured to be viewed by a user.

Figure 2:
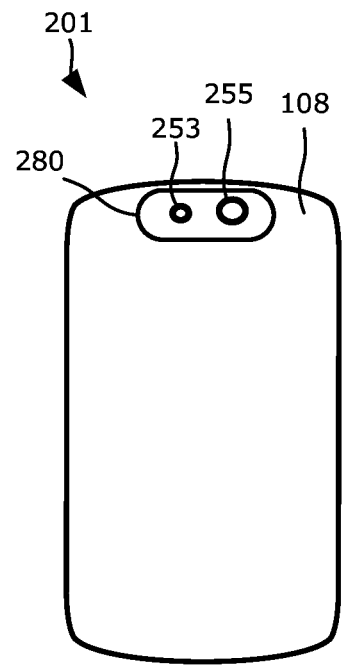
FIG. 2 is a rear elevation view of the example electronic device of FIG. 1 in accordance with example embodiments of the present disclosure.

FIG. 2 illustrates a rear view of the electronic device 201. The rear view of the electronic device illustrates a rear face 108 of the electronic device 201. The rear face 108 is a side of the electronic device 201 which does not include a main display 204 of the electronic device 201. In the embodiment illustrated, the rear face 108 is a side of the electronic device 201 which is opposite the front face 106 (FIG. 1) of the electronic device 201. That is, the rear face 108 may be substantially parallel to the front face 106 of the electronic device 201.

The electronic device 201 includes one or more cameras 253. The cameras 253 are configured to generate camera media, such as images in the form of still photographs, motion video or another type of camera data. The camera media may be captured in the form of an electronic signal which is produced by an image sensor associated with the camera 253. Components other than the image sensor may be associated with the camera 253, although such other components may not be shown in the Figures. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera media or camera data) from which information referred to as image context may be computed.

In the embodiment illustrated, the electronic device 201 includes a rear facing camera 253. A rear facing camera is a camera 253 which is located to obtain images of a subject near a rear face 108 of the electronic device 201. That is, the rear facing camera may be located on or near a rear face 108 of the electronic device 201.

In other embodiments (not illustrated), the electronic device 201 may include a front facing camera instead of or in addition to the rear facing camera. A front facing camera is a camera which is located to obtain images of a subject near the front face 106 of the electronic device 201. That is, the front facing camera may be generally located at or near a front face 106 of the electronic device 201. The front facing camera may be located anywhere on the front surface of the electronic device; for example, the front facing camera may be located above or below the display 204. In at least some example embodiments, the front facing camera may be provided in a central location relative to the display 204 to facilitate image acquisition of a face. In at least some embodiments, the front facing camera may be used, for example, to allow a user of the electronic device 201 to engage in a video-based chat with a user of another electronic device 201. In at least some embodiments, the front facing camera is mounted internally within a housing of the electronic device 201 beneath a region of the front face 106 which transmits light. For example, the front facing camera may be mounted beneath a clear portion of the housing which allows light to be transmitted to the internally mounted camera.

In at least some embodiments (not shown), the electronic device 201 may include a front facing camera and also a rear facing camera. The rear facing camera may obtain images which are not within the field of view of the front facing camera. The fields of view of the front facing and rear facing cameras may generally be in opposing directions.

The electronic device 201 includes a flash 255. The flash 255 may, in at least some embodiments, be a light emitting diode (LED) flash. The flash 255 emits electromagnetic radiation. More particularly, the flash 255 may be used to produce a brief bright light which may facilitate picture-taking in low light conditions. That is, the flash 255 may emit light while an image is captured using the camera 253. In the embodiment illustrated, the flash 255 is located to emit light at the rear face 108 of the electronic device 201. That is, the flash is a rear-facing flash in the illustrated embodiment. The electronic device 201 may include a front-facing flash instead of or in addition to the rear facing flash to emit light at the front face 106 of the electronic device 201. The electronic device 201 may have additional camera hardware which may complement the camera 253.

Still referring to FIG. 2, a transparent cover 280 covers the image sensor of the camera 253 and the flash 255. The transparent cover 280 allows light to pass through (e.g. from the flash 255 to the exterior of the housing or from the exterior of the housing to the image sensor) and prevents debris or dirt from entering into the housing. Dirt or debris that could otherwise enter into the housing could potentially damage the components of the camera 253 and flash 255. In the embodiment illustrated in FIG. 2 a transparent cover 280 is secured to the housing. For example, the transparent cover 280 may be secured to the housing an adhesive or using snaps or similar attachment mechanism in such a manner so as to be flush with the housing. The transparent cover 280 can be transparent and made out of glass or plastic or another suitable transparent or translucent material. For example, the lens 280 can be made out of stained or partially stained glass.

Figure 3:
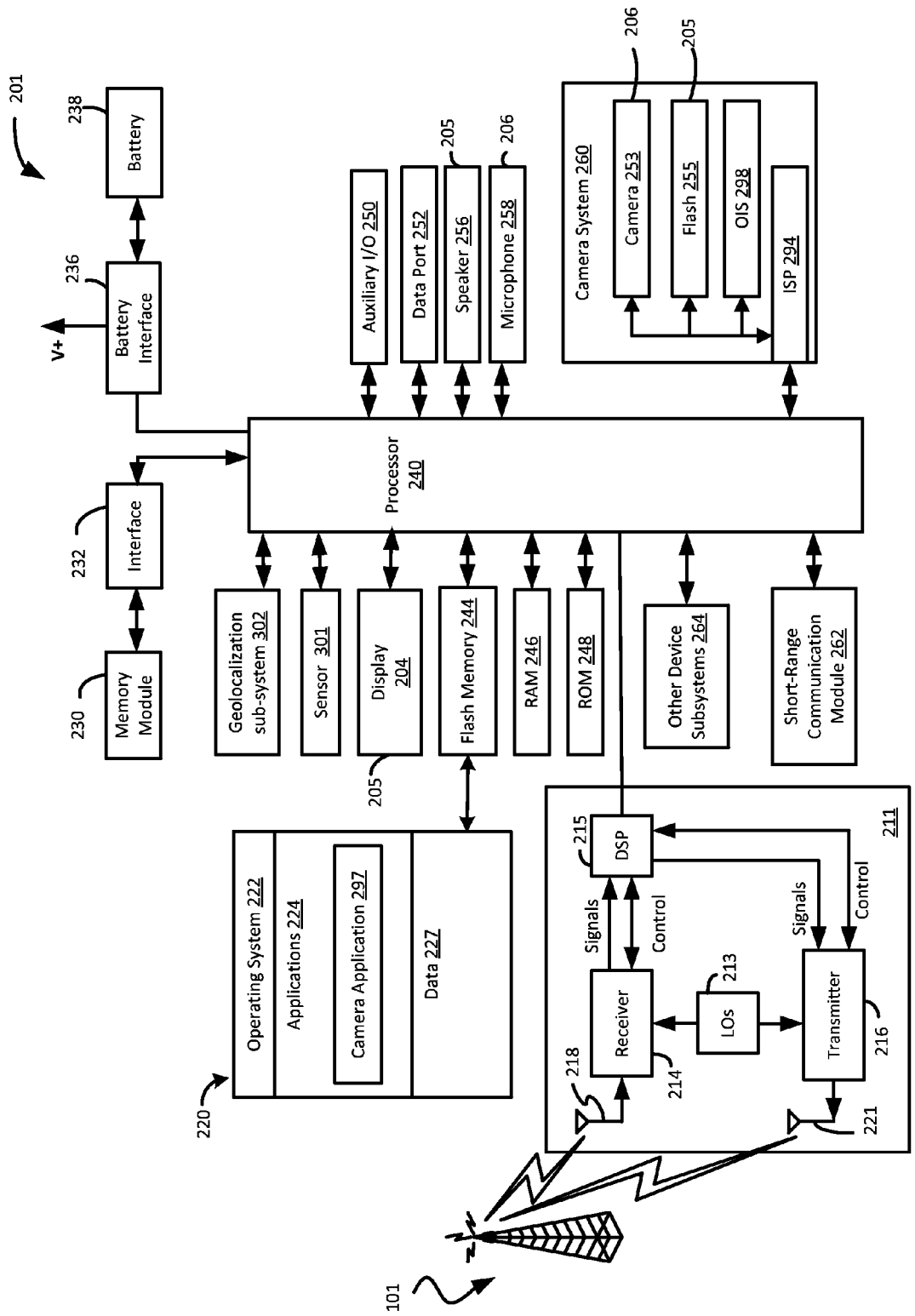
FIG. 3 is a block diagram illustrating components of the example electronic device of FIG. 1 in accordance with example embodiments of the present disclosure.

Referring now to FIG. 3, a block diagram of an example electronic device 201 is illustrated. The electronic device 201 of FIG. 3 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), a flash 255, one or more speakers 256, or other output interfaces), a short range communication module 262, and other device subsystems generally designated as 264. Some of the subsystems shown in FIG. 3 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data. The data 227 may, in at least some embodiments, include metadata which may store information about the images. In some embodiments the metadata and the images may be stored together. That is, a single file may include both an image and also metadata regarding that image. For example, in at least some embodiments, the image may be formatted and stored as a JPEG image.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing. Further, data may be transmitted to and from the electronic device 201 using a WiFi network or using near field communication technologies.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 can also include one or more sensor 301 such as temperature sensor, rotation sensors (for example, a gyroscope), translation sensors (for example accelerometers), position sensors (for example, magnetometers), and sensor sub-systems such as a geolocalization subsystem 302, which can be based on a global positional signal.

In the embodiment illustrated, the camera 253 is included in a camera system 260 along with a flash 255, an optical image stabilizer (OIS) 298 and an image signal processor (ISP) 294. The optical image stabilizer (OIS) 298 may be integrated with the camera 253 or it may be a separate component. For example, the OIS 298 may be considered as a functional part of the camera system 260. Similarly, the ISP 294 may be embedded in the processor 240 and it may also be considered as a functional part of the camera system 260. In at least some embodiments, the camera 253 may be associated with a dedicated image signal processor 294 which may provide at least some camera-related functions, with the image signal processor 294 being either embedded in the camera 253 or a separate device. For example, in at least some embodiments, the image signal processor 294 may be configured to provide auto-focusing functions. Functions or features which are described below with reference to the camera application 297 may, in at least some embodiments, be provided, in whole or in part, by the image signal processor 294.

The camera system 260 associated with the electronic device 201 also includes a flash 255. As noted above, the flash 255 is used to illuminate a subject while the camera 253 captures an image of the subject. The flash 255 may, for example, be used in low light conditions. In the example embodiment illustrated, the flash 255 is coupled with the main processor 240 of the electronic device 201. The flash 255 may be coupled to the image signal processor 294, which may be used to trigger the flash 255. The image signal processor 294 may, in at least some embodiments, control the flash 255. In at least some such embodiments, applications associated with the main processor 240 may be permitted to trigger the flash 255 by providing an instruction to the image signal processor 294 to instruct the image signal processor 294 to trigger the flash 255. In one or more embodiments, the image signal processor 294 may be coupled to the processor 240.

The optical image stabilizer 298 can be coupled to the camera 253 or the image signal processor 294 or both and operates to stabilize the camera 253 during an image capture. The optical image stabilizer 298 may receive instructions from the image signal processor 294. Similarly, the optical image stabilizer 298 may be coupled to the processor 240 and may receive instructions from the processor 240. The image signal processor 294 may obtain data from the optical image stabilizer 298 relating to its movement and operation. In one or more embodiments, the camera system 260 may have a separate memory (not shown) on which the image signal processor 294 can store data and retrieve instructions. Such instructions may, for example, have been stored in the memory by the processor 240, which may in some embodiments also be coupled to the separate memory in the camera system 260.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220, such as applications 224, stored in memory such as persistent memory; for example, in the flash memory 244. As illustrated in FIG. 3, the software modules 220 may include operating system software 222 and one or more additional applications 224 or modules such as, for example, a camera application 297. The processor 240 may also operate to process data 227 stored in memory associated with the electronic device 201.

In the example embodiment of FIG. 3, the camera application 297 is illustrated as being implemented as a stand-alone application 224. However, in other example embodiments, the camera application 297 could be provided by another application or module such as, for example, the operating system software 222. Further, while the camera application 297 is illustrated with a single block, the functions or features provided by the camera application 297 could, in at least some embodiments, be divided up and implemented by a plurality of applications and/or modules. In one or more embodiments, the camera application 297 can be implemented by the ISP 294.

The camera application 297 may, for example, be configured to provide a viewfinder on the display 204 by displaying, in real time or near real time, an image defined in the electronic signals received from the camera 253. The camera application 297 may also be configured to capture an image or video by storing an image or video defined by the electronic signals received from the camera 253 and processed by the image signal processor 294. For example, the camera application 297 may be configured to store an image or video to memory of the electronic device 201.

The camera application 297 may also be configured to control options or preferences associated with the camera 253. For example, the camera application 297 may be configured to control a camera lens aperture and/or a shutter speed. The control of such features may, in at least some embodiments, be automatically performed by the image signal processor 294 associated with the camera 253.

In at least some embodiments, the camera application 297 may be configured to focus the camera 253 on a subject. For example, the camera application 297 may be configured to request the image signal processor 294 to control an actuator of the camera 253 to move a lens (which is comprised of one or more lens elements) in the camera 253 relative to an image sensor in the camera 253. For example, when capturing images of subjects which are very close to the camera 253 (e.g. subject at macro position), the image signal processor 294 may control the actuator to cause the actuator to move the lens away from the image sensor.

In at least some embodiments, the image signal processor 294 may provide for auto-focusing capabilities. For example, the image signal processor 294 may analyze received electronic signals to determine whether the images captured by the camera are in focus. That is, the image signal processor 294 may determine whether the images defined by electronic signals received from the camera 253 are focused properly on the subject of such images. The image signal processor 294 may, for example, make this determination based on the sharpness of such images. If the image signal processor 294 determines that the images are not in focus, then the camera application 297 may cause the image signal processor 294 to adjust the actuator which controls the lens to focus the image.

In at least some embodiments, the camera application 297 may be configured to control a flash associated with the camera 253 and/or to control a zoom associated with the camera 253. In at least some embodiments, the camera application 297 is configured to provide digital zoom features. The camera application 297 may provide digital zoom features by cropping an image down to a centered area with the same aspect ratio as the original. In at least some embodiments, the camera application 297 may interpolate within the cropped image to bring the cropped image back up to the pixel dimensions of the original.

The software modules 220 or parts thereof may be temporarily loaded into volatile memory such as RAM 246. The RAM 246 is used for storing runtime data variables and other types of data or information. Although specific functions are described for various types of memory, this is merely one example, and a different assignment of functions to types of memory could also be used.

Exemplary Camera System with Optical Image Stabilizer

Components of an exemplary camera system 260 will now be described in more detail with reference to the embodiment shown in FIG. 4. The camera system 260 includes a camera 253, a flash 255, an image signal processor (ISP) 294 and an optical image stabilizer (OIS) 298.

The camera 253 includes a lens 480, a focusing actuator 404 and an image sensor 406. The lens 480 can have a fixed focal length or a variable focal length (i.e. optical zoom lens). If the lens 480 has a variable focal length, a zoom actuator (not shown) may be associated with the camera 253. The zoom actuator can adjust the focal length (e.g. from instructions received from the ISP 294). The camera 253 can also include a lens barrel for holding the lens 480 in position as well as other components that may be used to operate a camera that are not illustrated. The camera 253 can be configured to acquire an image of the scene. An image of the scene can be the environment that is visible through the lens 480, for example. The image of the scene can be represented by light energy imaged by the lens 480 and received at the image sensor 406. The lens 480 can include various transparent or translucent lens elements (or both) that can be configured to bend or focus light (or both) coming from outside of the camera 253. The position of the lens 480 and/or lens elements can be such that the light that passes through them arrives at the image sensor 406 as an optical image of the scene (which may include optical signals). The image sensor 406 can then convert this optical image (i.e. light that arrives at the image sensor 406) into electrical signals. The image of the scene, which may be the received optical signals, can thus be represented by the electrical signals.

The focusing actuator 404 is connected to the lens 480 (or lens elements as the case may be) and can move the lens 480 relative to the image sensor 406 thereby causing the image of the scene as converted into electrical signals by the sensor 406 to appear to be more or less sharp.

Figure 4:
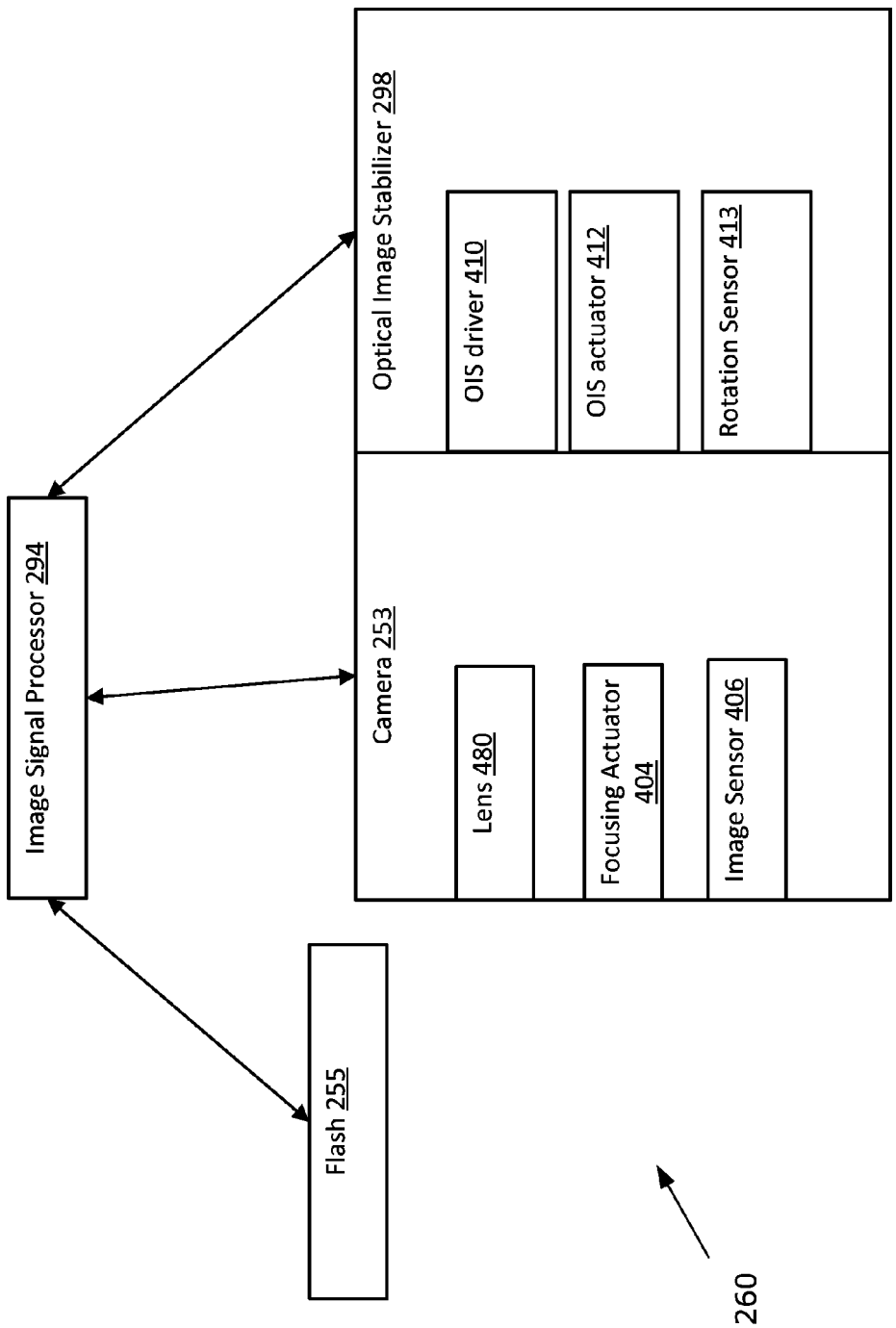
FIG. 4 is a block diagram illustrating components of an example camera system.

There may be more components associated with a camera 253 that are not shown in the illustrated embodiment of FIG. 4 including a housing for holding or supporting all of the components, an optical filter for reflecting or absorbing infrared light and additional electronic components.

The ISP 294 may be connected to the camera 253 for obtaining image context associated with the acquired image of the scene. For example, the ISP 294 can be connected to the focusing actuator 404 or to the image sensor 406 or to both and can obtain or receive data from the focusing actuator 404 or the image sensor 406 or both related to the image of the scene. The ISP 294 or the sensor 406 or both can also be associated with or can include a memory (not shown) for storing instructions or data. For example, the ISP 294 or the sensor 406 may store data in memory concerning the lens 480 (for example the effective focal length) or any other subcomponent of the camera 253 or the camera 253 assembly (for example the distance from the lens 406 to the image sensor 406). The ISP 294 may also be able to access the electrical signals created at the image sensor 406. Using this access, the ISP 294 can obtain some image context data from the electrical signals. For example, the ISP 294 may have access to such image context as a colour temperature or a histogram associated with the image of the scene. Image context may also include the distance between the lens 480 and the image sensor 406, which may be determined by the ISP 294 from data sent or received from the focusing actuator 404. The ISP 294 can operate the focusing actuator 404 thereby causing the scene content (or image of the scene) to zoom in or zoom out or to become more or less sharp.

The electrical signals representative of the image of the scene may be stored as pixels (or texels) in a memory associated with the camera 253 or associated with the ISP 294 or any memory associated or accessible to the electronic device 201. Pixels can represent visual data (e.g. in RGB format) for locations on a viewing area. The viewing area may be the display 204, for example.

In one or more embodiments, the ISP 294 is configured to obtain image context for multiple sequential images of the scene. For example, the ISP 294 may be configured to obtain image context for sequential images at a rate of at least 30 images per second. In other words the ISP 294 obtains image context for 30 separate instances over a second. In one or more embodiments, the distance between the lens 280 (or at least one lens element) and the image sensor 406 can be different for two or more of the multiple sequence images of the scene. The ISP 294 may retrieve image context related to two or more of the multiple sequential images of the scene and compare and evaluate each images of the scene (e.g. using image context) to determine which image is the sharpest or to determine which image is evaluated as the best in accordance with another evaluation metric (such as brightness, level of noise from electric gain, etc.).

In one or more embodiments, the ISP 294 controls the exposure time of the optical image of the scene on the sensor 406 and thereby controls the exposure time of an image captured with the camera 253. For example, the camera 253 may include a mechanical shutter (not shown) which in turn may be operatively connected to the ISP 294 so that the ISP 294 can control the shutter speed of the shutter. In some other embodiments the ISP 294 can control the exposure time of each pixel on the sensor 406 thereby controlling the exposure time of an image captured with the camera 253.

In one or more embodiments, the ISP 294 is connected to and controls the focusing actuator 404 in order to control the level of focus applied to the scene content (or to the image of the scene).

The OIS 298 includes an OIS driver 410, an OIS actuator 412 and a rotation sensor 413. The OIS driver 410 may be connected to the OIS actuator 412 in order to control the OIS actuator 412. The OIS 298 (and specifically the OIS actuator 412) operates to counteract a movement of the camera 253 in order to maintain the sharpness of an image captured by the camera 253. One or more movements of the camera can be sensed by the rotation sensor 413. For example, the rotation sensor 413 may have the ability to sense rotation of the camera 453 around one or more axes of the camera 453. The movement of the camera 253 may cause the optical image of the scene to be translated on the image sensor 406. As a result the same optical detail of the image may be sampled by more pixels on the sensor 406 than without any movement. As a result the image of the scene will appear blurry. The movement of the camera 253 may be as a result of the camera 253 shaking while it is being held for example. The OIS 298 can act on the camera 253 or on its line of sight to counteract or attempt to cancel the effect of the shaking on the acquisition of the image scene by the sensor 406 and therefore counteract the blur of a captured image caused by shaking.

In one or more embodiments, the rotation sensor 413 is embedded in the camera 253. In one or more alternative embodiments, the rotation sensor 413 is physically external to the camera 253 and can be a sensor shared with (or associated with) other sub-components of the electronic device 201. The rotation sensor 413 may be considered a functional part of the camera system 260.

In one or more embodiments the OIS actuator 412 and the focusing actuator 404 are integral or combined together or form a single actuator. In other embodiments the OIS actuator 412 and the focusing actuator 404 are different actuators. The OIS actuator 412 may be considered a component of the OIS 298. The focusing actuator 404 may be a component of the camera 253. In one or more embodiments, the OIS driver 410 may be part of the ISP 294. In other embodiments the OIS driver 410 and the ISP 294 are different (i.e. separate) components. The OIS driver 410 may be a component of the OIS 298.

The OIS 298 may be implemented in a number of different ways. For example, the OIS actuator 412 may be connected to the camera lens 280 so as to move or translate the camera lens 280 relative to the image sensor 406 to counteract the shaking or movement of the camera 253.

By way of further example, the OIS actuator 412 may be connected to the image sensor 406 so as to move or translate the image sensor 406 relative to the camera lens 280 to counteract the movement of the camera 253.

By way of further example, the OIS 298 can operate by rotating the camera 253 in order to counteract the movement created by the shaking. For example, this can be done by rotating a sub-assembly (or sub-component) of the camera 253 containing the lens 480, sensor 406 and actuator 404 inside the body of the camera 253.

By way of further example, the OIS 298 can operate by optically tilting the light coming into the camera 253 in order to optically change the line of sight and counteract the movement created by unwanted camera 253 movements (e.g. shaking). For example, this can be done by rotating a mirror or using another device or component that can introduce optical tilt associated with the camera 253.

The OIS 298 may also be connected to the ISP 294. For example, the ISP 294 may provide instructions to the OIS 298 in order to operate the OIS 298. Similarly, the OIS driver 410 may be in communication with the ISP 294 in order to receive instructions and or retrieve data. In one or more embodiments, the OIS driver 410 receives image context from the ISP 294 and controls the OIS 298 based on the content of the image context. The image context received from the ISP 294 may be received in real-time. For example, the image context received from the ISP 294 may be the image context associated with the current screen content. The OIS 298 may also include a memory (not shown) that can store data or instructions that may be used in the operation of the OIS 298. In one or more embodiments, the OIS 298 is connected to the camera 253 and is configured to operate in one of a selection of modes of operation based on the image context obtained by the ISP 294.

In accordance with one or more embodiments, the OIS 298 can operate in one or more different modes. For example, the OIS 298 can operate in an engaged mode and a not engaged mode. By way of further example, the OIS 298 can operate in an engaged mode, a not engaged mode or in one or more special engaged modes. In the engaged mode, the OIS 298 can be fully operational within a range of movement. For example, in the engaged mode the OIS 298 can counteract (or attempt to counteract) a range of movement of the camera 253. For example, the range of movement could include a tilt of one or more degrees in either direction (in relation to a pre-defined axis). By way of further example, the range of movement could include a frequency of camera 253 movements between 2 Hertz and 20 Hertz. In the not engaged mode, the OIS 298 is not operational. For example, in the not engaged mode the OIS 298 will not compensate for or counteract (and will not attempt to compensate for or counteract) any movement of the camera 253. In the special engaged mode, the OIS 298 may be partially operational or operational on a different range of compensation (e.g. frequency or movement) than when operating in the engaged mode. For example, in the special engaged mode the OIS 298 can counteract (or will attempt to counteract) certain predefined movements of the camera 253. The predefined movements of the camera 253 can be a range of frequency of movement or a range of angles (or degrees) of movement, for example. For example, the predetermined range of angles (or degrees) could include a movement of 0.5 degrees in either direction even when using an OIS 298 that is able to compensate up to a one degree movement in either direction. By way of further example, the predetermined movements of the camera 253 can include a range of frequency of camera 253 movements of between 1 Hertz and 10 Hertz even when using an OIS 298 able to compensate up to 20 Hertz, and even if the engaged mode only compensates higher frequencies than 2 Hz.

In accordance with one or more embodiments, the ISP 294 can be connected to the OIS 298 in order to instruct the OIS 298 to operate in a particular mode of operation. For example, the instructions from the ISP 294 may be received at the OIS driver 410 which may in turn instruct the OIS actuator 412 to operate in a particular mode of operation. The instructions may be received from the ISP 294 at predetermined intervals. Or, alternatively, the instructions may be received from the ISP 294 on the occurrence of certain events. For example, the ISP 294 may detect a certain change in image context or may evaluate the image context to determine that a certain (pre-defined) threshold has been reached. For example the image context may indicate that the intensity of the light received at the camera 253 is increased by a predetermined amount or the image context may indicate that the image of the scene has been zoomed in (i.e. that the lens 280 has moved in relation to the image sensor 406).

Example Methods of Adapting an OIS

An exemplary method 500 of adapting an OIS for a camera 253 will now be described with reference to FIG. 5. The method 500 can be implemented on a camera 253 associated with or connected to an electronic device 201, such as that shown in FIGS. 1 and 2, for example.

Figure 5:
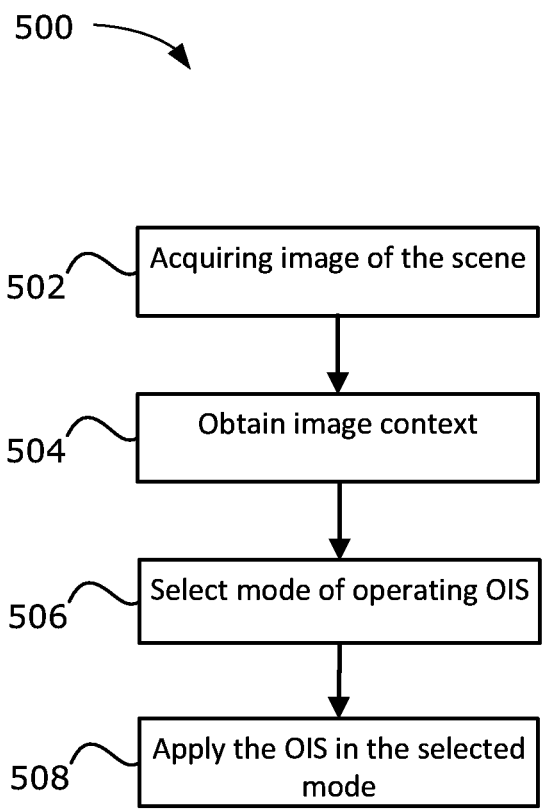
FIG. 5 is a flow-chart depicting a method of adapting an OIS.
Figure 6:
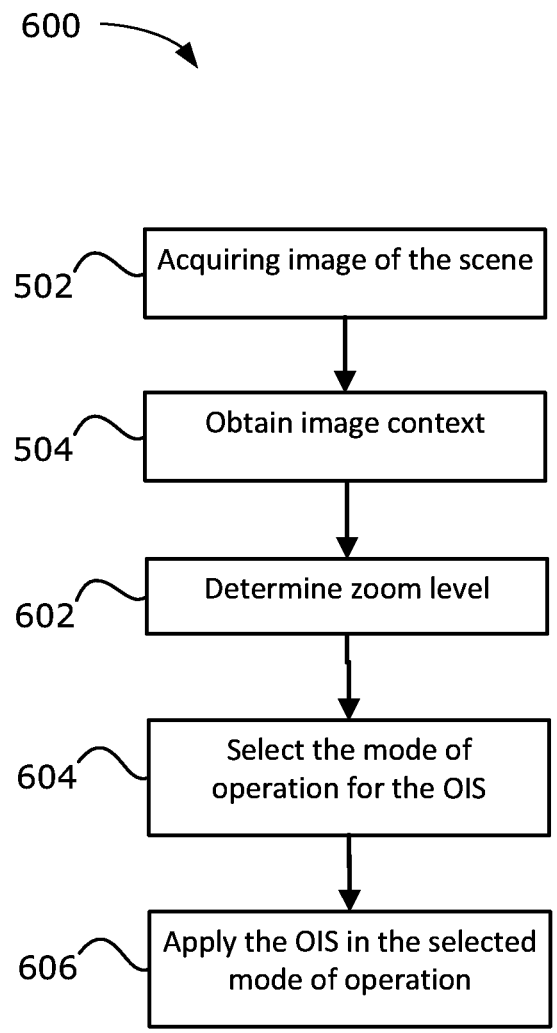
FIG. 6 is a flow-chart depicting a method of adapting an OIS.

One or more of the processor 240, the ISP 294 and the OIS driver 410 may be configured to carry out the methods (500, 600) described in reference to FIGS. 5 and 6.

At 502, an image of the scene is acquired. In accordance with an exemplary embodiment, the image sensor 406 acquires the image of the scene. For example, the image of the scene is received at or acquired by the image sensor 406 as a set of optical signals. The optical signals can be converted to electrical signals at the image sensor 406 so that the electrical signals are representative of the image of the scene. The electrical signals can be accessed or processed by the ISP 294. Further, the ISP 294 can instruct the image sensor 406 to convert optical signals to electrical signals thereby capturing an image. The electrical signals can be stored in a memory associated with the ISP 294.

At 504, image context associated with the image of the scene is obtained. For example, an ISP 294 that communicates with the camera 253 can access or obtain image context associated with the image of the scene. Image context can include (but is not limited to) a colour temperature associated with the image of the scene (or the electrical signals representative of the image of the scene); a colour temperature associated with a subset of the pixels associated with the image of the scene; a colour histogram associated with the image of the scene or with a subset of the pixels associated with the image of the scene; or a zoom level associated with the lens 480 or the ISP 294. The image context can be obtained at, before or around the time that an image is captured. For example, the ISP 294 may have access to a memory (not shown) where image context can be stored so that image context can be stored in the time leading up to the capture of an image. Continuing with the example, the ISP 294 can retrieve the image context from memory after the image is captured.

In one or more embodiments, image context can be obtained from a sensor, such as a gyroscope or thermometer, from a geolocalization system or from a clock. For example, at least one sensor can be associated with the ISP 294 and from which the ISP 294 can retrieve image context. For example, the ISP 294 may retrieve the image context from the sensor at the time or during the time the image of the scene is obtained (e.g. when the electrical signal is created based on the optical signal at the image sensor 406). In an example, the sensor is a gyroscope and the image context is the tilt of the camera 253 calculated by the gyroscope. The ISP 294 may associate a certain mode of operation of the OIS 298 if the tilt of the camera 253 relative to the ground is within a predefined threshold range of angles. In another example, the sensor is a light sensor and the image context is sensed light intensity associated with the image of the scene. The ISP 294 can associate a specific mode of operation of the OIS 298 with a specific range of light intensities. In another example the image context can include the geographic localization determined using the geolocalization system 302 of the electronic device 201. The ISP 294 can associate a specific mode of operation of the OIS 298 with the geographic localization. As noted, image context can be stored in memory (e.g. on an ongoing basis) and then retrieved from memory after the image is captured.

At 506, a mode of operating the OIS 298 based on the obtained image context is selected. For example, a mode of operating the OIS 298 can be selected to optimize one of the noise level and sharpness of the image of the scene based on the image context. As described above, a higher noise level in the image of the scene can correspond with an increase in the electronic gain applied to the image of the scene. To counteract the noise level, the OIS 298 can be applied in order to be able to set a longer exposure and compensate shaking defects, which can in some conditions decrease the sharpness of at least a portion of the image of the scene due to OIS defects. For example, the sharpness of an image may be decreased if the OIS 298 is applied despite a short exposure and if the image is zoomed out. Such a situation can occur if there is relatively bright light, relatively little electric gain is applied to the image of the scene and the view is a landscape view (e.g. if the lens 280 is relatively close to the image sensor 406). In another example, in a situation when the camera 253 is implemented to capture video, a mode of operating of the OIS 298 can be selected to minimize the effect of certain frequencies of movement of the camera 253 depending on the geographic localization of the camera 253. Such a situation can occur if the electronic device 201 is located in a geographic localization that corresponds to an ocean or sea. The mode of operation of the OIS 298 can include counteracting certain frequencies (such as a pre-determined range of frequencies) that correspond to frequencies such as the movement of ocean waves.

Selecting a mode of operation (506) can include selecting one of an engaged mode in which the OIS 298 is configured to counteract a camera movement and a not engaged mode. In the not engaged mode the OIS 298 does not have any effect on the image of the scene. For example, in the not engaged mode the OIS 298 does not counteract any movement associated with the camera 253.

In accordance with one or more embodiments, the image context includes a colour temperature associated with the image of the scene. For example, the ISP 294 can determine that an average colour temperature associated with the image of the scene is at least Tmax Kelvins and the exposure time is lower than Ymin seconds and in such a situation the selected mode of operating the OIS 298 can be the not engaged mode (wherein Tmax and Ymin are optimized depending on the camera 253 capabilities). Continuing with the example, if the ISP 294 determines that the average colour temperature associated with the image of the scene is less than Tmin Kelvins and the exposure time is higher than Ymax seconds then the selected mode of operating the OIS 298 can be the engaged mode (Tmin and Ymax being optimized depending on the camera 253 capabilities). In other words, the ISP 294 can associate the not engaged mode for the OIS 298 with a predefined range of colour temperatures.

By way of further example, the image context can include an exposure time associated with the image of the scene. For example, the ISP 294 can determine that the exposure time associated with the image of the scene is at least Y seconds (Y to be optimized depending on the camera 253). For example, the ISP 294 can determine the exposure time at the time the image data or image context is obtained from the image sensor 406 associated with the camera 253. The ISP 294 can then determine that the selected mode of operating the OIS 298 is the not engaged mode whereby the ISP 294 instructs the OIS 298 not to operate. In other words, the ISP 294 can associate the not engaged mode for the OIS 298 with a predefined range of exposure times.

By way of further example, the image context can include a flash activation. For example, the ISP 294 can determine that the flash needs to be activated for a still picture. The ISP 294 can then determine that the selected mode of operating the OIS 298 is the engaged mode whereby the ISP 294 instructs the OIS 298 to operate at this engaged mode. In other words, the ISP 294 can associate the engaged mode for the OIS 298 with the flash activation. In one or more alternative embodiments, the ISP 294 can associate a special engaged mode for the OIS 298 with the flash activation.

The selected mode of operation can be identified and stored in a memory associated with the ISP 294, for example. By way of further example, a memory associated with the ISP 294 can store data indicating or identifying a mode of operation of the OIS 298 and associated image context. For example, the memory may indicate that certain colour temperatures are associated with certain modes of operation of the OIS 298. Accordingly, the selection of the mode of operation can be a performed by the ISP 294 based on the obtained image context by retrieving the identified associated mode of operation of the OIS 298. The ISP can then instruct the OIS 298 (e.g. by instructing the OIS driver 410) to operate the OIS actuator 412 in accordance with the identified mode of operation of the OIS 298.

In accordance with one or more embodiments, selecting a mode of operating the OIS (506) can include selecting one of an engaged mode in which the OIS 298 is configured to counteract a camera 253 movement, a special engaged mode in which the OIS 298 is configured to counteract a predetermined range of degrees of a camera 253 movement and a not engaged mode. In one or more embodiments, the predetermined range of angles (or degrees) of movement of the camera 253 can be plus or minus 0.5 degrees. The degrees of movement of the camera 253 can be a measurement of the amount that a camera 253 has rotated. For example, the measurement of rotation can be the amount that a camera 253 has rotated for a set period of time.

In accordance with one or more embodiments, in the special engaged mode, the OIS 298 is further configured to counteract a predetermined range of frequencies of camera movement. For example, the predetermined range of frequencies of camera movement can be 2 Hertz to 10 Hertz. The predetermined range of frequencies can be adapted to conform to or depending on the OIS 268 capabilities.

At 508 the OIS 298 is applied using the selected mode of operation. For example, if the selected mode of operation is the engaged mode, then the ISP 294 will instruct the OIS 298 to operate (or attempt to operate) on the camera 253 to counteract shaking movement of the camera 253. By way of further example, if the selected mode of operation is the not engaged mode, then the ISP 294 will instruct the OIS 298 not to operate on the camera 253 thereby not counteracting any movement of the camera 253. In yet another example, if the selected mode of operation is the special engaged mode then the ISP 294 will instruct the OIS 298 to operate (or attempt to operate) on the camera 253 to counteract a limited amount or a different range of movement.

In accordance with one or more embodiments, the method 500 may also include capturing an image or video using the camera 253 while the OIS 298 is applied using the selected mode of operation. For example, capturing an image using the camera 253 while the OIS 298 is applied in the selected mode of operation can be performed in response to the camera receiving input. The input can be from a button or from a signal received from an external source, for example.

In one or more embodiments the mode of operation of the OIS 298 can be changed. For example, an image or a video can be captured by the camera 253 while the OIS 298 is applied in a selected mode of operation and then a subsequent image can be captured by the camera 253 while the OIS 298 is applied in another selected mode of operation. By way of further example, after an image is captured by the camera 253 subsequent image of the scene can be acquired (502), subsequent image context can be obtained (504) and a subsequent mode of operating the OIS 298 can be selected (506) and applied (508). A subsequent image or video can be captured while the OIS 298 is applied. In yet a further example, after an image is captured a new mode of operating the OIS 298 can be selected (506) and then applied (508) while capturing a subsequent image without obtaining image context (504).

FIG. 6 shows another method 600 of adapting an OIS 298 for a camera 253. As with the previously described exemplary method 500 of FIG. 6, the method 600 includes acquiring image of the scene (502) and obtaining image context associated with the image of the scene (504).

In accordance with an embodiment, the image context comprises a zoom level of the image of the scene. The zoom level may be controlled by the ISP 294 or may be controlled at the camera application 297, for example. In one or more embodiments, the zoom level is a digital zoom. The digital zoom can be controlled by input into the camera 253. The input may be from a button on the exterior of the camera 253 or may be from another component of the camera 253. For example, input may be received instructing the camera 253 (or ISP 294) to increase the zoom level. The image to be captured, which may be viewable through the display 204 and which comprises at least a portion of the image of the scene, can be stored digitally (as representative electronic signals) in a memory. When the digital zoom level is increased, the outer portion of the digital image visible on the display 204 may be cropped (or deleted from the view in the display 204, for example) so that the image visible on the display 204 becomes magnified. Thus, the remaining portion of the digital image may then be viewable in the display 204 and will appear to be enlarged or zoomed in. The captured image may be correspondingly cropped after being captured and may be stored in memory in its cropped form. The level of zoom may be measured by the ISP 294 and be considered image context. The zoom level may be measured as a percentage increase of the size of the zoomed image relative to the image of the scene. For example, the image visible on the display 204 may be compared to the image to be captured in order to determine the amount of the image to be captured that is cropped. Similarly, or inversely, the percentage of increase in the size of the image visible on the display 204 as compared to the size of the image to be captured may be used as the zoom level measurement. The "image to be captured" can identify the image that is received as optical signals at the image sensor 406, for example. The "image to be captured" may become the captured image after the corresponding electronic signals (from the image sensor 406) are stored in memory. For example, a level of zoom of at least ×2 (i.e. magnified by two times) may be associated with the fully engaged mode of operation of the OIS 298. For example, because the edges of the image of the scene are cropped from the image to be captured at a certain level of zoom, any blurriness or noise introduced at the edges of the image of the scene by the operation of the OIS 298 may not be visible in the image to be captured. In one or more alternative embodiments, the zoom level is controlled by an optical zoom.

At 602, it is determined that the zoom level is within a predetermined range. In another embodiment, it may be determined that the zoom level is in a different range. Different ranges of zoom levels may be associated with different modes of operating the OIS 298.

At 604 a mode of operating the OIS 298 is selected based on the obtained image context. In accordance with an embodiment, selecting a mode of operating the OIS includes selecting one of an engaged mode in which the OIS 298 is configured to counteract or compensate for a camera 253 movement, a special engaged mode in which the OIS 298 is configured to counteract or compensate for a predetermined range of motion of a camera 253 movement and a not engaged mode. In the not engaged mode the OIS 298 may not be operating to counteract or compensate for any movement of the camera 253. In accordance with an example, the selected mode of operating the OIS 298 is a special engaged mode when the zoom level of the image of the scene is between 1× and 2× (i.e. between one time and 2 times of magnification).

At 606 the OIS 298 is applied using the selected mode of operation. For example, the special engaged mode of operation of the OIS 298 can be applied after certain lens configurations are determined. In accordance with one or more embodiments, in the special engaged mode the OIS 298 operates to counteract or compensate for at least a predetermined frequency of camera movement. In another example, in the special engaged mode the OIS 298 operates to counteract or compensate for at least a predetermined angle of movement (e.g. in degrees) or a predetermined range of angles of movement.

In one or more embodiment, the image context includes the configuration of the lens 480. For example, the configuration of the lens 480 may include the position of the lens 480 relative to the image sensor 406. For example, it may be determined that the lens 480 is positioned by at least a predetermined distance relative to the image sensor 406.

In one or more embodiment, electronic gain can be applied to the electrical signal representative of the image of the scene.

The camera 253 can be located in or connected to a communication device or mobile communication device. The communication device can be an electronic device such as a computer, a handheld computer, a mobile device, a mobile phone, a cellular phone, a personal digital assistant, a tablet computer, a desktop computer, a wearable computer, a personal computer or a smart phone.

While the present application is primarily described in terms of methods, a person of ordinary skill in the art will understand that the present application is also directed to various apparatus' such as an electronic device including a mobile communications device or camera. The electronic device includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

In one or more embodiments the term "image context" can be understood to include "image data". Image data may be stored in a one or more memory.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

One or more embodiments have been described by way of example. It will be apparent to persons skilled in the art that a number of variations and modifications can be made without departing from the scope of what is defined in the claims.

What is claimed is the following:

1. A method of adapting an optical image stabilizer (OIS) for a camera, the method comprising:
    acquiring an image of a scene;
    obtaining image context associated with the image of the scene, the image context comprising a colour temperature associated with the image of the scene;
    selecting a mode of operating the OIS based on the colour temperature by determining that an average colour temperature associated with the image of the scene is at least a predetermined temperature and selecting a not-engaged mode; and,
    applying the OIS using the selected mode of operation.

2. The method of claim 1, wherein selecting a mode of operating the OIS based on the obtained image context comprises selecting a mode of operating the OIS to optimize one of the noise level and sharpness of the image of the scene based on the image context.

3. The method of claim 1, wherein the image context is obtained from the image of the scene using an image signal processor (ISP) associated with the camera.

4. The method of claim 1, wherein selecting a mode of operating the OIS comprises selecting one of an engaged mode in which the OIS is configured to counteract a range of camera movements and a not engaged mode.

5. The method of claim 1, wherein the image context further comprises an exposure time associated with the image of the scene and wherein the selection of the mode of operating the OIS is also based on the exposure time.

6. The method of claim 5, further comprising determining that the exposure time associated with the image of the scene is at least a predetermined amount of time and wherein the selected mode of operating the OIS is the engaged mode.

7. The method of claim 1, wherein selecting a mode of operating the OIS comprises selecting one of an engaged mode in which the OIS is configured to counteract a range of camera movements, a special engaged mode in which the OIS is configured to counteract a predetermined range of camera movements and a not engaged mode, wherein the predetermined range of camera movements is different from the range of camera movements.

8. The method of claim 7, wherein the predetermined range of camera movements comprises a predetermined range of degrees of camera movement.

9. The method of claim 8, wherein the predetermined range of degrees of camera movement is 0 to 1 degree.

10. The method of claim 7, wherein the predetermined range of camera movements comprises at least a predetermined frequency of camera movement.

11. The method of claim 10, wherein the predetermined frequency of camera movement comprises camera movement between 2 and 20 Hertz.

12. The method of claim 7, wherein the image context comprises a zoom level of the image of the scene.

13. The method of claim 12, further comprising determining that the zoom level is more than two times magnification and wherein the selected mode of operating the OIS is the engaged mode.

14. The method of claim 1, further comprising capturing an image using the camera while the OIS is applied using the selected mode of operation.

15. The method of claim 1, further comprising applying electronic gain to the image of the scene.

16. The method of claim 1, wherein the camera is connected to a mobile communication device.

17. An electronic device comprising:
 a camera configured to acquire an image of a scene;
 an image signal processor (ISP) connected to the camera for obtaining image context associated with the acquired image of the scene, the image context comprising a colour temperature associated with the image of the scene; and,
 an optical image stabilizer (OIS) connected to the camera, the OIS configured to operate in one of a selection of modes of operation based on the colour temperature, and wherein the OIS is configured to operate in a not-engaged mode when an average colour temperature associated with the image of the scene is at least a predetermined temperature.

18. A non-transitory computer readable memory comprising computer-executable instructions which, when executed, cause a processor to:
 instruct a camera to acquire an image of a scene;
 obtain image context associated with the image of the scene, the image context comprising a colour temperature associated with the image of the scene;
 select a mode of operating an optical image stabilizer (OIS) based on the colour temperature by determining that an average colour temperature associated with the image of the scene is at least a predetermined temperature and selecting a not-engaged mode; and, apply the OIS using the selected mode of operation.

\* \* \* \* \*